(12) United States Patent
Yi et al.

(10) Patent No.: US 8,716,417 B2  
(45) Date of Patent: May 6, 2014

(54) OLEFIN POLYMERIZATION CATALYST AND PREPARATION METHOD AND USE THEREOF

(75) Inventors: Jianjun Yi, Beijing (CN); Chunming Cui, Beijing (CN); Huashu Li, Beijing (CN); Zhifei Li, Beijing (CN); Baozuo Yin, Beijing (CN); Liang Cui, Beijing (CN); Jianying Zhang, Beijing (CN); Liang Wang, Beijing (CN)

(73) Assignee: PetroChina Company Limited (CN)

( * ) Notice: Subject to any disclaimer, the term of this patent is extended or adjusted under 35 U.S.C. 154(b) by 0 days.

(21) Appl. No.: 13/702,209

(22) PCT Filed: Jun. 3, 2011

(86) PCT No.: PCT/CN2011/000944  
§ 371 (c)(1),  
(2), (4) Date: Dec. 5, 2012

(87) PCT Pub. No.: WO2012/142733  
PCT Pub. Date: Oct. 26, 2012

(65) Prior Publication Data  
US 2013/0072647 A1 Mar. 21, 2013

(30) Foreign Application Priority Data  
Apr. 22, 2011 (CN) .......................... 2011 1 0102567

(51) Int. Cl.  
*C08F 4/44* (2006.01)  
*B01J 35/08* (2006.01)  
*B01J 31/00* (2006.01)

(52) U.S. Cl.  
USPC ....... 526/125.3; 526/123.1; 502/10; 502/158; 502/169

(58) Field of Classification Search  
None  
See application file for complete search history.

(56) References Cited

U.S. PATENT DOCUMENTS

| | | | |
|---|---|---|---|
| 4,298,718 A | 11/1981 | Mayr et al. | |
| 4,495,338 A | 1/1985 | Mayr et al. | |
| 7,619,049 B1 * | 11/2009 | Fang et al. ................. | 526/125.3 |
| 2009/0280977 A1 | 11/2009 | Fushimi | |

FOREIGN PATENT DOCUMENTS

| | | |
|---|---|---|
| CN | 85100997 A | 1/1987 |
| CN | 1033058 A | 5/1989 |
| CN | 1143651 A | 2/1997 |
| CN | 1306544 A | 8/2001 |
| CN | 1580084 A | 2/2005 |
| CN | 1690090 A | 11/2005 |
| CN | 101323650 A | 12/2008 |
| EP | 0 361 494 A2 | 4/1990 |
| GB | 2111066 | 6/1983 |
| JP | 64-6007 * | 1/1989 |

OTHER PUBLICATIONS

"International Application No. PCT/CN2011/000944, International Search Report mailed Feb. 9, 2012", 12 pgs.

* cited by examiner

*Primary Examiner* — Ling Choi  
*Assistant Examiner* — Catherine S Branch  
(74) *Attorney, Agent, or Firm* — Schwegman, Lundberg & Woessner, P.A.

(57) ABSTRACT

An olefin polymerization catalyst and preparation method and use thereof are provided. The components of the catalyst comprise an active magnesium halide, a titanium compound containing at least one Ti-halide bond loaded on the active magnesium halide, and an internal electron donor selected from one or more silicon esters compounds having formula (I). The method for preparing the catalyst components is that: adding spherical magnesium chloride alcoholate particles and the electron donor into the solution of titanium compound in sequence, and processing with the titanium compound for one or more times to obtain the catalyst. The catalyst system used for the olefin polymerization comprises the catalyst components, a cocatalyst and an external electron donor. The catalyst has high activity for the propylene polymerization, and the activity is 4399 gPP/gTi·h(50° C., 1 h, slurry polymerization at atmospheric pressure), and the isotacticity of the polymer is 98%.

General formula (I)

$$R_3\text{—C(=O)—O—Si}(R_1)(R_2)\text{—O—C(=O)—}R_4$$

10 Claims, No Drawings

OLEFIN POLYMERIZATION CATALYST AND PREPARATION METHOD AND USE THEREOF

PRIORITY CLAIM TO RELATED APPLICATIONS

This application is a national stage application under 35 U.S.C. §371 of PCT/CN2011/000944, filed Jun. 3, 2011, and published as WO 2012/142733 A1 on Oct. 26, 2012, which claims priority to Chinese Application No. 201110102567.6, filed Apr. 22, 2011, which applications and publication are incorporated by reference as if reproduced herein and made a part hereof in their entirety, and the benefit of priority of each of which is claimed herein.

FIELD OF THE INVENTION

The present invention relates to a catalyst for olefin polymerization and preparation therefor and use of the catalyst in catalyzing olefin polymerization.

BACKGROUND OF THE INVENTION

The development of polyolefin resin with high performance was dependent on continual enhancement of behavior of the olefin polymerization catalysts. In U.S. Pat. No. 4,298,718 and U.S. Pat. No. 4,495,338, proposed firstly was the activated magnesium halide as a carrier supporting the Ziegler-Natta catalyst, wherein the catalysts produced from the carrier and titanium tetrachloride exhibited high activity in propylene polymerization, but was poor in stereospecificity. Subsequently, the constant effort was made by research staff to improve the catalyst behavior. In GB2,111,066, disclosed was polypropylene having high isotacticity prepared by contacting magnesium chloride alcoholate with liquid titanium compound while adding an electronic donor (such as phthalate) to give a solid titanium catalyst, and then adding another electronic donor (alkoxysilane compound) for olefin polymerization. The solid catalyst component disclosed in EP0361,494 comprised activated magnesium halide, a titanium compound supported thereon and having at least one Ti-halide, and organic diether or polyether, such as the catalyst prepared with 1,3-diether as the electronic donor compound. Without addition of the external electron donor, the catalyst system was used for polymerization to provide polypropylene having high isotacticity, and was highly active. In CN1,143,651A, further improvement was made on the internal and/or external electron donor in the type of catalysts, wherein 1,3-diether used in the system had a carbon atom at 2-position bonded with an organic group having two or three unsaturated bonds to provide a monocyclic or polycyclic ring structure, i.e. polyene-1,3-diether ring, allowing the activity and stereospecificity of the catalyst to improve to a certain extent. CN1,306,544 described that succinate was used as the internal electron donor, and the prepared catalyst exhibited high activity and stereospecificity when used for catalyzing propylene polymerization, and provided polypropylene with broad molecular weight distribution.

From the typical catalytic polymerization system above, the electron donor had an influence, to a greater or less extent, on the activity and stereospecificity of the catalyst and polymer perfomance, and played a critical role in the tacticity of polypropylene. Therefore, development of polyolefin catalyst was optimization of available electron donor and development of novel electron donor. Most of the electron donors currently reported was the phosphorus, nitrogen, oxygen-containing compound, such as carboxylate, ether, organophosphorus, amine, silane compounds, and was classified into monoesters, diesters (including succinate, alcohol esters), and diethers. It was found during research that the estersil compounds used as the internal electron donor had a special reactivity with titanium compound and magnesium compound, and thus prepared catalysts exhibited very high activity and stereospecificity when used for catalyzing olefin polymerization.

SUMMARY OF THE INVENTION

The present invention aims to provide a catalyst for olefin polymerization and preparation therefor and uses thereof.

The catalyst component described herein comprises (1) activated magnesium halide, (2) a titanium compound supported thereon and having at least one Ti-halide bond, and (3) an electron donor selected from one or more estersil compounds having general formula (I).

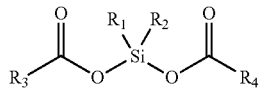

General formula (I)

In the estersil compounds of formula (I), $R_1$, $R_2$, $R_3$ and $R_4$ may be the same or different, and may be a monocyclic, polycyclic ring or heteroatom-containing ring groups or various aliphatic chain groups, or any two therein each forms a spirocyclic ring, one of $R_1$ and $R_2$ together with $R_3$ and $R_4$ may form a cage-like ring; $R_1$ and $R_2$ may be the same or different and are respectively selected from halogen, alkoxy, substituted alkyl, cycloalkyl, aryl, aralkyl or alkylaryl, alkenyl, alkynyl, alkylalkenyl, alkylalkynyl, fused ring and heteroatom-containing ring, and may also form a ring with each other; $R_3$ and $R_4$ may be same or different, and are respectively selected from alkoxy, substituted alkyl, cycloalkyl, aryl, aralkyl or alkylaryl, alkenyl, alkynyl, alkylalkenyl, alkylalkynyl, fused ring and heteroatom-containing ring; The method includes reacting the magnesium halide (1) or a precursor thereof with the titanium compound (2) and the electron donor compound (3), wherein the electron donor compound (3) is added prior to or during reaction with the titanium compound or the halogenated compound, and may be added in portions.

The acyloxysilane compound is selected from diacyloxy substituted silane, triacyloxy-substituted silane and tetraacyloxysilane.

When the acyloxysilane compound described herein is diacyloxysilane, the following is preferred:
  diacetyloxy-(2,3-epoxy-propoxy)-methyl-silane;
  diacetyloxy-(2,3-epoxy-propoxy)-ethenyl-silane;
  dimethyl-di-(pyridine-2-acetyloxy)-silane;
  methyl-chloro-di-(pyridine-2-acetyloxy)-silane;
  dichloro-di-(pyridine-2-acetyloxy)-silane;
  diacetyloxy-dibutyl-silane;
  diacetyloxy-tert-butyloxy-n-butyloxy-silane;
  diacetyloxy-dimethyl-silane;
  diacetyloxy-methyl-ethenyl-silane;
  diacetyloxy-methyl-propenyl-silane;
  dimethyl-di-propanoyl-silane;
  diacetyloxy-diethyl-silane;
  diacetyloxy-ethyl-ethenyl-silane;
  diethyl-di-propanoyl-silane;
  di-isobutyryl-dimethyl-silane;

di-chloracetyloxy-dimethyl-silane;
diacetyloxy-(2-chloro-ethyl)-methoxy-silane;
diacetyloxy-butoxy-methyl-silane;
diacetyloxy-methyl-penta-1-ynyl-silane;
diacetyloxy-tert-butyloxy-methyl-silane;
dimethyl-di-valeryl-silane;
diacetyloxy-methyl-hex-1-ynyl-silane;
diacetyloxy-isobutoxy-methyl-silane;
diethyl-di-butanoyl-silane;
diethyl-di-chloroacyloxy-silane;
diacetyloxy-diethoxy-silane;
diacetyloxy-ethoxy-(2-chloro-ethyl)-silane; 1,1-diacetyloxy-3,3,3-triethyl-1-methyl-disilane;
α-(diacetyloxy-methyl-silyloxy)-isobutanenitrile;
diacetyloxy-dibutoxy-silane;
diethyl-di-(2-bromo-propanoyl)-silane;
di-chloroacetyloxy-dimethyl-silane; 1,1-diacetyloxy-1,3,3,3-tetraethyl-disilane;
diacetyloxy-di-tert-butyloxy-silane;
dimethyl-di-(3-trimethylsilane-propanoyl)-silane;
dimethyl-di-trifluoroacetyloxy-silane;
dimethyl-di-trichloracetyloxy-silane;
diethyl-di-trifluoroacetyloxy-silane;
diethyl-di-trichloracetyloxy-silane;
diisopropoxy-dibutanoyl-silane;
dipentyloxy-diacetyloxy-silane;
diisopropoxy-di-(3-isopropoxycarbonyl-propanoyl)-silane;
dimethyl-di-(isobutenoyl)-silane;
chloromethyl-methyldiacetyloxysilane;
di-benzoyl-dimethyl-silane;
methyl-iodomethyl-diacetyloxysilane;
diacryloyl-dimethyl-silane;
di(o-chlorobenzoyl)dimethylsilane;
methyl-ethynyl-diacetyloxysilane;
diacetyloxy-methyl-(3,3,3-trifluoro-propyl)-silane;
[2,2']spiro-di(benzene[1,3,2]dioxysilicon)-4,4'-dione;
1-[phenyldi(propanoyl)silane]adamantane;
diphenyldi(trifluoroacetyloxy)silane;
diacetyloxy-methyl-phenyl-silane;
methyl-phenyl-di-(isobutenoyl)-silane;
diacetyloxy-diphenyl-silane;
2-acetyloxy-2-ethyl-[1,2]oxysilicon-6-one;
diacetyloxy-cyclopenta-2,4-diene-methyl-silane;
diacetyloxy-phenyl-ethenyl-silane;
diacetyloxy-phenyl-propenyl-silane;
diacetyloxy-(4-chloro-phenyl)-ethenyl-silane;
diacetyloxy-(4-allyl-phenyl)-methyl-silane;
diacetyloxy-(4-tertbutyl-phenyl)-methyl-silane;
diacetyloxy-methyl-[1]naphthyl-silane;
diethyl-di-benzoyl-silane;
1,1-diacetyloxy-3,3,3-triethyl-1-phenyl-disilylether;
dimethoxy(diacetyloxy)silane;
dimethoxy(dibutanoyl)silane;
diphenyl-di(4-chloro-benzoyl)silane;
diphenyl-di(4-bromo-benzoyl)silane;
diphenyl-di(4-hydroxyl-benzoyl)silane; and
1-acetyloxy-1,2-dihydro-sil-1-ene acetate.

When the acyloxysilane compound described herein is triacyloxysilane, the following is preferred:
triacetyloxy-(furan-2-carbonyl)-silane;
triacetyloxy-(thiophene-2-carbonyl)-silane;
triacetyloxy-methyl-silane;
triacetyloxy-ethenyl-silane;
triacetyloxy-isopropyl-silane;
triacetyloxy-allyl-silane;
triacetyloxy-isobutyl-silane;
triisobutyryl-methyl-silane;
methyl-tri-trifluoroacetyloxy-silane;
ethyl-tri-trifluoroacetyloxy-silane;
propyl-tri-trifluoroacetyloxy-silane;
pentyl-tri-trifluoroacetyloxy-silane;
methyl-tri-pentafluoropropanoyl-silane;
ethyl-tri-pentafluoropropanoyl-silane;
propyl-tri-pentafluoropropanoyl-silane;
pentyl-tri-pentafluoropropanoyl-silane;
ethyl-tri-heptafluorobutanoyl-silane;
propyl-tri-heptafluorobutanoyl-silane;
acetonyl-triacetyloxysilane;
bromomethyl-triacetyloxysilane;
iodomethyl-triacetyloxysilane;
tri-trifluoroacetyloxy-phenyl-silane;
triacetyloxy-(2,4-dichloro-phenyl)-silane;
cyclohexyl-tri-trifluoroacetyloxy-silane;
triacetyloxy-cyclohexyl-silane;
triacetyloxy-phenyl-silane;
phenyl-tribenzoyl-silane;
triacryloyl-ethyl-silane;
tripropanoyl-ethenyl-silane;
tri-difluoroacetyloxy-propyl-silane;
(chloromethyl)triacetyloxysilane;
(β,β,β-trichloro-tert-butyloxy)-triacetyloxy-silane; and
1-methyl-2,8,9-trioxa-5-aza-1-sila-bicyclo[3,3,3]undecan-3,7,10-trione.

When the acyloxysilane compound described herein is tetraacyloxysilane, the following is preferred:
tetraacetyloxysilane;
(4-methyl-benzoic acid) silicic acid anhydride;
(4-hydroxyl-benzoic acid) silicic acid anhydride;
(2-methyl-benzoic acid) silicic acid anhydride;
benzoic silicic acid anhydride; and
tetra-chloracetyloxy-silane.

The present invention provides the structural formulae of several polyacyloxy silane compounds below:

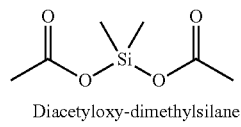

Diacetyloxy-dimethylsilane (A)

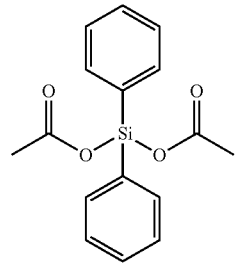

Diacetyloxy-diphenylsilane (B)

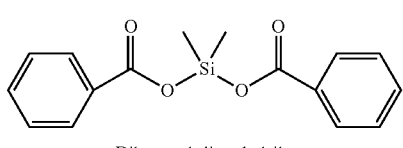

Dibenzoyl-dimethylsilane (C)

The general method for synthesizing the compounds of polyacyloxy silane series is as follows:

Chlorosilane is dissolved into an organic solvent, and 2 eq. acyloxy sodium dissolved into the same solvent is dropped, stirred for 2 to 8 hours, filtered for separation and washed; after removal of the solvent, it is subject to fractionation at reduced pressue, to obtain the product as colourless liquid or colourless solid-liquid mixture at room temperature. The following representative compounds were measured for $^1$H NMR spectra with $CDCl_3$ as the solvent, with its data as follows:

(A) diacetyloxy-dimethyl silane:

| 0.46 ppm | singlet | 6H $CH_3$ |
| 2.07 ppm | singlet | 6H $CH_3$ |

(B) diacetyloxy-diphenyl silane

| 2.14 ppm | singlet | 6H $CH_3$ |
| 7.42 ppm | triplet | 4H aromatic |
| 7.51 ppm | triplet | 2H aromatic |
| 7.74 ppm | doublet | 4H aromatic |

(C) dibenzoyl-dimethyl silane

| 0.74 ppm | singlet | 6H $CH_3$ |
| 7.46 ppm | triplet | 4H aromatic |
| 7.59 ppm | triplet | 2H aromatic |
| 8.09 ppm | doublet | 4H aromatic |

The titanium compound (2) in the catalyst component described herein is selected from titanium halide or titanium halide alcolholate, with titanium tetrachloride being preferred; the precursor of activated magnesium halide (1) is selected from $RMgX$, $MgR_2$, $MgCl_2 \cdot mROH$, $Mg(OR)_2$, $XMg(OR)$, or a mixture of magnesium halide and titanium alcoholate, wherein m is 1 to 4, X is halogen, and R is alkyl of $C_1$-$C_{20}$.

It is another object for the present invention to provide two methods for preparing the solid catalyst component for olefin polymerization. The first preparation method is characterized by using the following steps:

(i) adding spherical particles of magnesium chloride alcoholate to a titanium tetrachloride liquid, with a reaction temperature being −40 to 0° C. and a reaction time being 0.1 to 3 hours;

(ii) with the temperature gradually raised to 40-100° C., adding an internal electron donor and reacting for 0.5 to 3 hours;

(iii) adding the titanium compound (2) at 80 to 140° C., reacting for 0.5 to 3 hours and filtering, with the step allowed to repeat for 1 to 3 times; and (iv) washing and drying, to obtain a spherical solid catalyst.

In the methods above, the spherical magnesium chloride alcoholate in Step (i) has the structural general formula of $Mg(OR_1)mX_{2-m} \cdot n(R_2OH)$, wherein n is an integer or decimal of 0<n<4; as disclosed in CN1034736C, the spherical magnesium chloride alcoholate is reacted with the titanium compound (2) for many times, with the at least one treating temperature being in the range of −40 to 0° C. and preferred in the range of −30 to 0° C., and the other treating temperature being in the range of 80 to 140° C. and preferred in the range of 90 to 130° C.; and based on total of the titanium compound, the molar ratio of Ti/Mg is in the range of 1 to 200, and preferred in the range of 1 to 100; the electron donor used in Step (ii) is the same as in the first method.

The present invention provides a solid catalyst system for catalyzing olefin polymerization, comprising the solid catalyst component synthesized by the method, the cocatalyst and the external electron donor, Wherein the cocatalyst is the aluminum alkyl compound having general formula of $AlR_nX_{(3-n)}$, in which R is alkyl having 1-20 carbon atoms, aralkyl, and aryl; X is halogen; and n is an integer of 0≤n≤3; such as trimethyl aluminum, triethyl aluminum, triisobutyl aluminum, trioctyl aluminum, diethyl aluminum hydride, diisobutyl aluminum hydride, diethyl aluminum chloride, diisobutyl aluminum chloride, ethyl aluminum dichloride; The external electron donor is selected from the siloxane compounds having general formula of $R_nSi(OR_1)_{4-n}$, in which R is alkyl of $C_1$-$C_{10}$, cycloalkyl or aryl, $R_1$ is alkyl containing 1-4 carbon atoms, n is an integer of 0≤n≤3, such as phenyltrimethoxysilane (PTMS), phenyltriethoxysilane (PTES), diphenyl dimethoxysilane (DPDMS), cyclohexylmethyldimethoxysilane (CMDMS), dicyclopentyldimethoxysilane (DCDMS), with phenyltriethoxysilane, diphenyldimethoxysilane, cyclohexylmethyldimethoxysilane and dicyclopentyldimethoxysilane being preferred.

For the solid catalyst system provided by the present invention for catalyzing olefin polymerization, the molar ratio of titanium in the solid catalyst component to aluminum in the cocatalyst is 1:1 to 1:2000, with 1:10 to 1:500 being preferred; and the molar ratio of the external electron donor to solid catalyst component based on Si/Ti is 1 to 100, with 1 to 50 being preferred. The slurry, bulk or vapour phase polymerization processes are available, with the polymerization temperature being 20 to 100° C., preferably 40 to 90° C.

DETAILED DESCRIPTION OF THE INVENTION

Preparation of catalyst in the examples was operated by using the Schlenk instrument under the protection of high pure nitrogen.

Embodiment 1

5 g spherical carrier was added to a reaction bottle charged with 150 mL $TiCl_4$ and precooled to −25° C., and heated up gradually to 80° C. over about 4 hours, 5 mmol diacetyloxy-dimethyl silane was added as the internal electron donor while the temperature was kept for 30 min; the temperature was continued to raise gradually to 130° C. for reaction for 2 hours; after the temperature was decreased, the supernatant liquid was removed and additional 125 mL $TiCl_4$ was added, heated up to 130° C. for further reaction for 2 hours; after the temperature was decreased, the supernatant liquid was removed and additional 125 mL $TiCl_4$ was added, heated up to 130° C. for further reaction for 2 hours, the supernatant liquid was removed and washed with n-hexane for 6 times at 80° C. until the washes was clear; the resulted solid was dried in vacuum, to give 1.8 g spherical catalyst with titanium content of 2.50%.

To a dried 250 mL three-necked reaction bottle having full replacement by nitrogen gas prior to by propylene gas to make the pressure in the system to be slightly higher than $1.1013 \times 10^5$ Pa, 100 mL n-heptane was added and heated to about 50° C., a certain amount of $AlEt_3$ was added, and a certain amount of diphenyldimethoxysilane was added as the external electron donor, the catalyst was added at constant temperature and after the temperature was kept for 1 hour, 100 mL alcoholic hydrochloric acid solution (mass fraction of 5% for hydrochloric acid) was added for stopping reaction.

The polymer was washed with absolute ethyl alcohol and dried in vacuum to give 6.27 g polypropylene. The catalyst had activity of 6320 gPP/gTi·h. The isotacticity was measured as 98.1% in a manner of extracting the polymer with the boiled heptane for 6 hours.

Comparative Embodiment 1

Prepared as in Embodiment 1, except that the internal electron donor was dibutyl phthalate, the content of titanium in the catalyst was 3.01%, the activity for propylene polymerization was 3322 gPP/gTi·h, and the isotacticity was 93%.

Embodiment 2

Prepared as in Embodiment 1, except that the internal electron donor was diacetyloxy-diphenyl silane, the content of titanium in the catalyst was 2.29%, the activity for propylene polymerization was 7586 gPP/gTi·h, and the isotacticity was 94.7%.

Embodiment 3

Prepared as in Embodiment 1, except that the internal electron donor was dibenzoyl-dimethyl silane, the content of titanium in the catalyst was 2.47%, the activity for propylene polymerization was 9809 gPP/gTi·h, and the isotacticity was 98.9%.

Embodiment 4

Prepared as in Embodiment 1, except that the internal electron donor was triacetyloxymethylsilane, the content of titanium in the catalyst was 2.35%, the activity for propylene polymerization was 10072 g(polymer)/g(Ti) hour$^{-1}$, and the isotacticity was 98.7%.

Embodiment 5

Prepared as in Embodiment 1, except that the internal electron donor was triacetyloxychlorosilane, the content of titanium in the catalyst was 2.47%, the activity for propylene polymerization was 8543 g(polymer)/g(Ti) hour$^{-1}$, and the isotacticity was 98.3%.

Embodiment 6

Prepared as in Embodiment 1, except that the internal electron donor was dibenzoyl-dichlorosilane, the content of titanium in the catalyst was 2.47%, the activity for propylene polymerization was 8791 g(polymer)/g(Ti) hour$^{-1}$, and the isotacticity was 98.5%.

INDUSTRIAL APPLICABILITY

The present invention provides the solid catalyst with high activity for propylene polymerization, for example, the catalyst with N-benzoyl-dimethyl silane as the internal electron donor has activity of 4399 gPP/gTi·h (50° C., 1 hour, slurry polymerization at normal pressure). Moreover, for propylene stereotactic polymerization, it provides the polymer with high isotacticity, for example, the catalyst with dibenzoyl-dimethyl silane as the internal electron donor and diphenyldimethoxysilane as the external electron donor for polymerization provides polypropylene with the isotacticity of 98%.

What is claimed is:

1. An olefin polymerization catalyst, comprising
activated magnesium halide, and a titanium compound supported thereon and having at least one Ti-halide bond, and
an internal electron donor selected from one or more estersil compounds as represented by general formula (I):

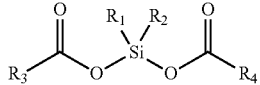

General formula (I)

wherein $R_1$, $R_2$, $R_3$, and $R_4$ independently have between 0 and 20 carbon atoms, are the same or different, and are independently selected from monocyclic ring, polycyclic ring, heteroatom-containing ring, fused ring, aliphatic chain group, halogen, alkoxy, substituted alkyl, acyl, acyloxy, cycloalkyl, aryl, aralkyl or alkylaryl, alkenyl, alkynyl, alkylalkenyl, and alkylalkynyl, wherein the monocyclic ring, polycyclic ring, or heteroatom-containing ring comprises a ring formed by one of $R_1$, $R_2$, $R_3$, and $R_4$, a spirocyclic ring formed between at least two of $R_1$, $R_2$, $R_3$, and $R_4$, or a ring formed between $R_1$ or $R_2$ and at least one of $R_3$ and $R_4$;

wherein, based on total moles of the titanium compound, a molar ratio of Ti/Mg is about 1 to about 200, and a molar ratio of the internal electron donor to magnesium is about 0.1 to about 2.

2. The olefin polymerization catalyst according to claim 1, wherein the estersil compound is selected from a diacyloxy-substituted silane, a triacyloxy-substituted silane, and a tetraacyloxy-substituted silane.

3. The olefin polymerization catalyst according to claim 1, wherein the estersil compound is selected from:
diacetyloxy-(2,3-epoxy-propoxy)-methyl-silane;
diacetyloxy-(2,3-epoxy-propoxy)-ethenyl-silane;
triacetyloxy-(furan-2-carbonyl)-silane;
triacetyloxy-(thiophene-2-carbonyl)-silane;
dimethyl-di-(pyridine-2-acetyloxy)-silane;
methyl-chloro-di-(pyridine-2-acetyloxy)-silane;
dichloro-di-(pyridine-2-acetyloxy)-silane;
tetraacetyloxysilane;
diacetyloxy-dibutyl-silane;
diacetyloxy-tert-butyloxy-n-butyloxy-silane;
diacetyloxy-dimethyl-silane;
diacetyloxy-methyl-ethenyl-silane;
diacetyloxy-methyl-propenyl-silane;
dimethyl-di-propanoyl-silane;
diacetyloxy-diethyl-silane;
diacetyloxy-ethyl-ethenyl-silane;
diethyl-di-propanoyl-silane;
di-isobutyryl-dimethyl-silane;
di-chloracetyloxy-dimethyl-silane;
triacetyloxy-methyl-silane;
diacetyloxy-(2-chloro-ethyl)-methoxy-silane;
diacetyl-butoxy-methyl-silane;
diacetyloxy-methyl-penta-1-ynyl-silane;
diacetyloxy-tert-butyloxy-methyl-silane;
dimethyl-di-valeryl-silane;
diacetyloxy-methyl-hex-1-ynyl-silane;
diacetyloxy-isobutoxy-methyl-silane;
diethyl-di-butanoyl-silane;
diethyl-di-chloroacyloxy-silane;

diacetyloxy-diethoxy-silane;
triacetyloxy-ethenyl-silane;
diacetyloxy-ethoxy-(2-chloro-ethyl)-silane;
triacetyloxy-isopropyl-silane;
triacetyloxy-allyl-silane;
1,1-diacetyloxy-3,3,3-triethyl-1-methyl-disilane;
α-(diacetyloxy-methyl-silyloxy)-isobutanenitrile;
diacetyloxy-dibutoxy-silane;
diethyl-di-(2-bromo-propanoyl)-silane;
di-chloracetyloxy-dimethyl-silane;
triacetyloxy-isobutyl-silane;
1,1-diacetyloxy-1,3,3,3-tetraethyl-disilane;
diacetyloxy-di-tert-butyloxy-silane;
dimethyl-di-(3-trimethylsilane-propanoyl)-silane;
triisobutyryl-methyl-silane;
dimethyl-di-trifluoroacetyloxy-silane;
dimethyl-di-trichloracetyloxy-silane;
diethyl-di-trifluoroacetyloxy-silane;
diethyl-di-trichloracetyloxy-silane;
tri-fluoroacetyloxy-propyl-silane;
tetra-chloroacetyloxy-silane;
methyl-tri-trifluoroacetyloxy-silane;
ethyl-tri-trifluoroacetyloxy-silane;
propyl-tri-trifluoroacetyloxy-silane;
pentyl-tri-trifluoroacetyloxy-silane;
methyl-tri-pentafluoropropanoyl-silane;
ethyl-tri-pentafluoropropanoyl-silane;
propyl-tri-pentafluoropropanoyl-silane;
pentyl-tri-pentafluoropropanoyl-silane;
ethyl-tri-heptafluorobutanoyl-silane;
propyl-tri-heptafluorobutanoyl-silane;
acetonyl-triacetyloxysilane;
diisopropoxy-dibutanoyl-silane;
dipentyloxy-diacetyloxy-silane;
bromomethyl-triacetyloxysilane;
iodomethyl-triacetyloxysilane;
diisopropoxy-di-(3-isopropoxycarbonyl-propanoyl)-silane;
(chloromethyl)triacetyloxysilane;
dimethyl-di-(isobutenoyl)-silane;
(β,β,β-trichloro-tert-butyloxy)-triacetyloxy-silane;
chloromethyl-methyldiacetyloxysilane;
di-benzoyl-dimethyl-silane;
methyl-iodomethyl-diacetyloxysilane;
diacryloyl-dimethyl-silane;
triacryloyl-ethyl-silane;
tripropanoyl-ethenyl-silane;
di(o-chlorobenzoyl)dimethylsilane;
methyl-ethynyl-diacetyloxysilane;
diacetyloxy-methyl-(3,3,3-trifluoro-propyl)-silane;
benzoic silicic acid anhydride;
[2,2]spiro-di(benzene[1,3,2]dioxysilicon)-4,4'-dione;
1-[phenyldi(propanoyl)silicon]adamantane;
diphenyldi(trifluoroacetyloxy)silane;
phenyl-tribenzoyl-silane;
diacetyloxy-methyl-phenyl-silane;
methyl-phenyl-di-(isobutenoyl)-silane;
diacetyloxy-diphenyl-silane;
triacetyloxy-phenyl-silane;
2-acetyloxy-2-ethyl-[1,2]oxysilicon-6-one;
diacetyloxy-cyclopenta-2,4-diene-methyl-silane;
diacetyloxy-phenyl-ethenyl-silane;
diacetyloxy-phenyl-propenyl-silane;
diacetyloxy-(4-chloro-phenyl)-ethenyl-silane;
diacetyloxy-(4-allyl-phenyl)-methyl-silane;
diacetyloxy-(4-tertbutyl-phenyl)-methyl-silane;
diacetyloxy-methyl-[1]naphthyl-silane;
diethyl-di-benzoyl-silane;
triacetyloxy-cyclohexyl-silane;
1,1-diacetyloxy-3,3,3-triethyl-1-phenyl-disilylether;
triacetyloxy-(2,4-dichloro-phenyl)-silane;
cyclohexyl-tri-trifluoroacetyloxy-silane;
tri-trifluoroacetyloxy-phenyl-silane;
(4-methyl-benzoic acid) silicic acid anhydride;
(4-hydroxyl-benzoic acid) silicic acid anhydride;
(2-methyl-benzoic acid) silicic acid anhydride;
dimethoxy(diacetyloxy)silane;
dimethoxy(dibutanoyl)silane;
diphenyl-di(4-chloro-benzoyl)silane;
diphenyl-di(4-bromo-benzoyl)silane;
diphenyl-di(4-hydroxyl-benzoyl)silane;
1-acetyloxy-1,2-dihydro-sil-1-ene acetate;
1-methyl-2,8,9-trioxa-5-aza-1-sila-bicyclo[3,3,3]undecan-3,7,10-trione;
[D]diacetyloxymethylthienylsilane; and
7-methyl-7-phenyl-6,8-dioxa-7-sila-benzocycloheptene-5,9-dione.

4. The olefin polymerization catalyst according to claim 1, wherein the titanium compound is selected from titanium halide and titanium haloalcoholate.

5. The olefin polymerization catalyst according to claim 1, wherein the titanium compound is titanium tetrachloride.

6. The olefin polymerization catalyst according to claim 1, wherein the precursor of activated magnesium halide is selected from $RMgX$, $MgR_2$, $MgCl_2 \cdot mROH$, $Mg(OR)_2$, $XMg(OR)$, and a mixture of magnesium halide and titanium alcoholate, wherein m is 1 to 4, X is halogen, and R is alkyl of $C_1$-$C_{20}$.

7. A method for preparing the olefin polymerization catalyst according to claim 1, comprising the following steps:
(i) adding a spherical particle of magnesium chloride alcoholate to a titanium tetrachloride liquid to give a reaction mixture, with a reaction temperature being about −40 to about 0° C. and a reaction time being about 0.1 to about 6 hours;
(ii) with the temperature gradually raised to about 40 to about 100° C., adding the estersil internal electron donor represented by formula (I) to the reaction mixture and reacting for about 0.5 to about 3 hours;
(iii) adding an additional amount of the titanium tetrachloride liquid of step (i) to the reaction mixture at about 80 to about 140° C., reacting for about 0.5 to about 3 hours and filtering, and repeating the step (iii) more than once;
(iv) washing and drying the reaction mixture, to obtain a spherical solid catalyst comprising the olefin polymerization catalyst of claim 1.

8. A use of the olefin polymerization catalyst according to claim 1, wherein:
the catalyst is used with a cocatalyst and an external electron donor for catalyzing olefin polymerization;
the cocatalyst is an aluminum alkyl compound with general formula of $AlR_nX_{(3-n)}$, wherein R is alkyl having 1-20 carbon atoms, aralkyl and aryl, X is halogen, and n is an integer of $0 \leq n \leq 3$;
the external electron donor is a siloxane compound with general formula of $R_nSi(OR_1)_{4-n}$, wherein R is alkyl of $C_1$-$C_{10}$, cycloalkyl and aryl, $R_1$ is alkyl having 1-4 carbon atoms, and n is an integer of $0 \leq n \leq 3$;
a molar ratio of titanium to aluminum in the cocatalyst is about 1:1 to about 1:2000; and
a molar ratio of the external electron donor to catalyst is about 1 to about 100 based on Si/Ti.

9. A use of the olefin polymerization catalyst according to claim 8, wherein the cocatalyst is trimethyl aluminum, triethyl aluminum, triisobutyl aluminum, trioctyl aluminum, diethyl aluminum hydride, diisobutyl aluminum hydride, diethyl aluminum chloride, diisobutyl aluminum chloride or ethyl aluminum dichloride.

10. A use of the olefin polymerization catalyst according to claim 8, wherein the external electron donor is phenyltrimethoxysilane, phenyltriethoxysilane, diphenyldimethoxysilane, cyclohexylmethyldiethoxysilane, and dicyclopentyldimethoxysilane.

* * * * *